Patented July 4, 1933

1,916,457

UNITED STATES PATENT OFFICE

ABRAHAM SIDNEY BEHRMAN, OF CHICAGO, ILLINOIS

PRODUCTION OF HALOGEN COMPOUNDS

No Drawing.  Application filed January 29, 1932. Serial No. 589,769.

The present invention relates to the production of reaction compounds of the halogens, and has particular reference to an improved process for the preparation of halides of hydrogen, alkali metals, alkaline earth metals and other elements or radicals, both inorganic and organic.

In my copending applications, Serial Nos. 370,737, filed June 13, 1929; 403,668, filed October 30, 1929; 409,424, filed November 23, 1929; and 544,710, filed June 15, 1931, are described several processes based upon the action of carbon on the halogens, more particularly in the presence of water and, unless a hydrogen halide is to be produced, some additional reagent. The present application, which constitutes a continuation in part of said applications, pertains to improvements by which the reaction of carbon and the halogens in the presence of water in the liquid phase, with or without the addition of other reagents is greatly facilitated.

In my copending application, Serial No. 370,737, there is described a method for the production of hydrochloric acid and other hydrogen halides by the action of a halogen, water, and carbon. The carbon is preferably of the "activated" variety of which several suitable grades are now commercially available. A typical chemical reaction by which one of the syntheses described presumably functions, may be shown in the following equation:

(1)  $2Cl_2 + 2H_2O + C = 4HCl + CO_2$

Copending application, Serial No. 409,424, discloses the production of halides other than hydrogen halide, direct from the proper halogen, carbon, water, and a suitable metal, salt, compound or other substance capable of forming the desired halide. For example, sodium bromide may be prepared by dissolving bromine in a solution of sodium carbonate. The solution of the bromine in the alkaline solution is readily accomplished, with the evolution of considerable carbon dioxide, the reaction apparently being:

(2)  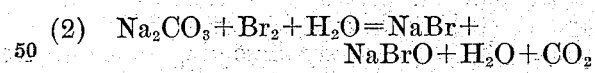

When this solution is passed through or otherwise treated with activated carbon the sodium hypobromite is converted to sodium bromide, presumably according to the following equation:

(3)  $2NaBrO + C = 2NaBr + CO_2$

Although it is not essential, it is greatly preferable to employ the bromine and sodium carbonate in such proportions that the reaction mixture contains no free alkali, and is preferably definitely acid. That is, the pH of the reaction mixture should be less than about 8.3 and preferably should be 7.0 or less. The reaction occurs even more readily when the pH is as low as 3.0 or less.

I have found that the maintenance of an acid condition in the reaction mixture is of great benefit in all instances where carbon, water, a halogen, and additional agents are reacted together. For example, in the production of a hydrogen halide according to Equation (1) the reaction is more rapid where the mixture is quite acid. Also, as in the example illustrated by Equations (2) and (3), where a halide other than a hydrogen halide is prepared direct from the halogen by reaction with water, carbon, and a reagent capable of furnishing the positive element or radical of the desired halide, it is desirable to employ an acid reaction mixture. In the latter case, where an excess of the halogen is employed, the reacting mixture is initially slightly acid due partly to the carbon dioxide liberated and partly to the disassociation to a small degree of the excess halogen in water with the formation of the corresponding halogen acids, and becomes more strongly acid as reaction of the excess halogen with the carbon proceeds. However, the reaction mixture may be made strongly acid even initially by the addition of a suitable acid, preferably the halogen acid corresponding to the halide being prepared.

I am not certain why it is advantageous to employ an acid reaction mixture; but it is conceivable that the conversion of sodium hypobromite to sodium bromide as shown in Equation (3) does not take place directly as indicated, but through the intermediate agency of hydrobromic acid; or it may be due to the inherently greater instability and reactivity of the hypohalites under acid conditions.

I have also found that it is frequently desirable to maintain the reaction mixture at an elevated temperature. In some cases the best results are obtained by boiling the solution during the reaction. Many reagents which will not form halides with water, carbon, and a suitable halogen at ordinary temperatures, will react readily at elevated temperatures, such as the boiling point of water, or at even materially higher temperatures, in combination with pressure. The use of elevated pressure alone will in some cases be found helpful.

While it is frequently desirable actually to boil the mixture during the reaction, this in some cases would obviously cause the evolution of considerable quantities of the halogen. For this reason I prefer either to employ a reflux condenser to return the volatilized halogen to the reaction mixture, or to reduce temperature of the mixture sufficiently to avoid undue loss of the halogen. The employment of a reflux condenser for the purpose indicated will obviously be valuable only in the case of the heavier halogens, such as bromine and iodine which are not gases at ordinary temperatures.

Heretofore it has been thought that the only effect which can be obtained upon bringing carbon, water, and iodine together is an adsorption of the iodine in the carbon. I have found, however, that iodides may be prepared from elemental iodine by the reaction of carbon and water or an aqueous solution containing the desired positive element or radical by heating the mixture, as for example, to its boiling point.

The state of division or available surface area of the carbon has an important bearing upon the effectiveness of the reactions indicated, and in accordance with my invention carbon in more or less finely powdered form is preferably employed. Although I prefer to use activated carbon, such as the grade made by processing lignite or certain cellulosic wastes of the paper industry, other and less active forms such as wood charcoal, raw lignite, and bone char may also be employed.

The use of an acid reaction mixture is readily accomplished by employing the batch method of producing halides in accordance with my invention. For example, a quantity of the halogen more than sufficient to produce enough hydrogen halide to neutralize the alkali may be dissolved in a solution of sodium carbonate. Where less alkaline solutions are employed the mixture tends to reach the desired degree of acidity more readily. This is illustrated by the production of halogen compounds of the amines.

To illustrate further the batch method of carrying out my process, the following example is given:

To 500 parts by weight of water are added 50 parts of powdered carbon. The mixture of carbon and water is heated to about 50° C. and well agitated. To this mixture is slowly added 50 parts of liquid bromine, the additions preferably being made through a reflux condenser. While this reaction is mildly exothermic, any necessary heat is supplied externally in order to compensate for radiation losses. The heating and agitation are continued until a sample of the liquid, when filtered free of carbon, does not show the presence of free bromine when subjected to the starch-iodide test. This solution now contains approximately 10% by weight of hydrobromic acid. It may be increased in strength by treatment with more bromine and carbon; or it may be concentrated by boiling until a constant strength solution is obtained. A stronger solution may also be produced directly by use of initially larger proportions of bromine and carbon. In any case the carbon remaining after the reaction will usually be found to contain appreciable amounts of adsorbed hydrogen bromide, which may be recovered by distillation or other suitable means.

As an example of a method I have used in the preparation of sodium bromide, I dissolve 50 parts by weight of sodium carbonate in 500 parts of warm water, and mix with this solution 50 parts of powdered activated carbon. To this solution, heated to about 50° C. are added, with constant agitation, about 85 parts of liquid bromine, corresponding to a little more than 10 per cent in excess of the amount theoretically equivalent to the sodium carbonate. When all the bromine has been added and no fumes of bromine are longer observed, the reaction mixture is heated to the boiling point (about 102° C.). After boiling for about 40 minutes, the reaction mixture is free of elemental bromine or hypobromites, and has a pH of less than 3.0. The solution is filtered to remove the carbon, evaporated to dryness and gently ignited to expel the small amount of hydrogen bromide present as well as to decompose and/or render insoluble compounds of iron, aluminum, silica and organic matter. The sodium bromide is then recrystallized, a salt of exceptional purity commonly being obtained with a single crystallization.

An excess of carbon was used in each of the above examples to accelerate the reaction. I believe that the employment of an excess of carbon accelerates reactions of this type very materially. The unconsumed carbon may be used repeatedly, provided that it is reactivated when required.

My improved process is not confined to the batch method, however. It may be made continuous by continuously dissolving an excess of the halogen in an aqueous solution containing the positive constituent of the desired halide, and continuously passing this solution, heated if desired, through one or more beds of carbon.

I claim:

1. The process of producing halides, which comprises reacting in acid mixture a halogen, carbon, and an aqueous solution containing a component capable of reacting in said mixture to provide the positive constituent of the desired halide.

2. The process of producing halides, which comprises reacting a mixture containing a halogen, carbon, and an aqueous solution containing a component capable of reacting in said mixture to provide the positive constituent of the desired halide, said reaction mixture having a pH of less than 8.3.

3. A process as described in claim 2, in which the pH of the reaction mixture is less than 7.0.

4. A process as described in claim 2, in which the pH of the reaction mixture is less than 3.0.

5. The process of producing halides, which comprises reacting a mixture containing a halogen, carbon, and an aqueous solution containing a component capable of reacting in said mixture to provide the positive constituent of the desired halide, and maintaining said mixture at an elevated temperature during said reaction.

6. The process for producing iodides, which comprises reacting a mixture containing iodine, carbon, and an aqueous solution containing a component capable of reacting in said mixture to provide the positive constituent of the desired iodide, and maintaining said mixture at an elevated temperature during said reaction.

7. The process of producing halides, which comprises reacting an acidic mixture containing a halogen, an excess of carbon, and an aqueous solution containing a component capable of reacting in said mixture to provide the positive constituent of the desired halide, and maintaining said mixture at an elevated temperature during the reaction.

8. The process of producing halides, which comprises reacting at an elevated temperature, a mixture containing a halogen, finely divided carbon, and an aqueous solution containing a component capable of reacting in said mixture to provide the positive constituent of the desired halide, said mixture having a pH of less than substantially 7.0.

9. The process of producing halides, which comprises reacting a mixture containing an excess of a halogen, an excess of carbon, and an aqueous solution containing a component capable of reacting in said mixture to provide the positive constituent of the desired halide, filtering said mixture after the reaction to remove said excess of carbon, evaporating the filtrate to dryness, igniting the residue, and recrystallizing the ignited residue.

10. The process of producing halides, which comprises reacting a mixture containing a halogen, carbon, and an aqueous solution containing a component capable of reacting in said mixture to provide the positive constituent of the desired halide, and maintaining said mixture at an elevated pressure during said reaction.

11. The process of producing halides, which comprises reacting a mixture containing a halogen, carbon, and an aqueous solution containing a component capable of reacting in said mixture to provide the positive constituent of the desired halide, and maintaining said mixture at an elevated temperature and elevated pressure during said reaction.

In testimony whereof I have hereunto subscribed my name.

ABRAHAM SIDNEY BEHRMAN.